United States Patent [19]

Kennedy, Jr.

[11] 3,999,784
[45] Dec. 28, 1976

[54] TUBE CLAMP MOUNTING
[75] Inventor: James C. Kennedy, Jr., Washington, Ill.
[73] Assignee: Caterpillar Tractor Co., Peoria, Ill.
[22] Filed: Sept. 18, 1975
[21] Appl. No.: 614,739
[52] U.S. Cl. .............................. 285/62; 248/54 R; 285/137 R
[51] Int. Cl.² ........................................ F16L 3/22
[58] Field of Search ................. 285/62, 63, 61, 49, 285/137 R; 248/54 R, 60, 15

[56] References Cited
UNITED STATES PATENTS

| 1,508,307 | 9/1924 | Tally | 285/61 X |
| 2,227,306 | 12/1940 | Guy | 248/54 R |
| 2,502,322 | 3/1950 | Iredell | 285/49 X |
| 2,932,475 | 4/1960 | Strogan | 248/54 R |
| 3,751,076 | 8/1973 | Thais et al. | 285/62 |
| 3,872,881 | 3/1975 | Miller et al. | 248/54 R |

FOREIGN PATENTS OR APPLICATIONS

| 756,920 | 4/1967 | Canada | 248/15 |
| 1,079,675 | 5/1954 | France | 248/15 |
| 1,260,143 | 1/1972 | United Kingdom | 285/49 |

Primary Examiner—Thomas F. Callaghan
Attorney, Agent, or Firm—Wegner, Stellman, McCord, Wiles & Wood

[57] ABSTRACT

A resilient mounting is provided for flexible lines carrying hydraulic fluid. The resilient mounting prevents the lines from abrading each other or being abraded by the mounting, which abrading produces detrimental wear resulting in premature failure of the lines. The resilient mounting supports the lines in a desired location while permitting certain limited, but controlled, movement of the lines. The limited, but controlled, movement is not sufficient to permit contact and wear between the lines or between the lines and the surrounding structures.

12 Claims, 3 Drawing Figures

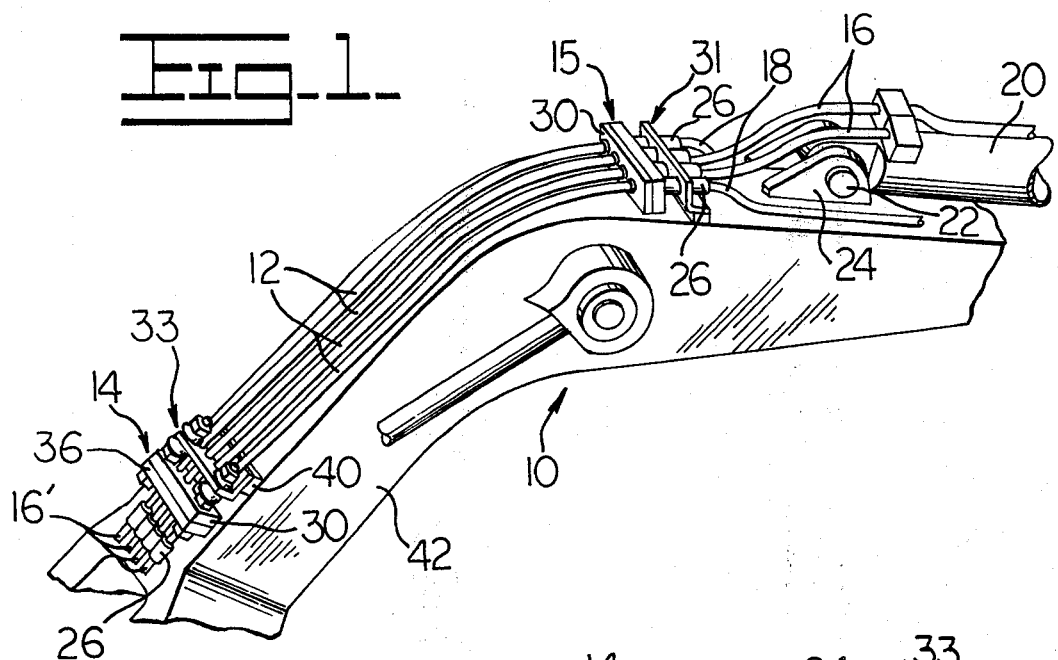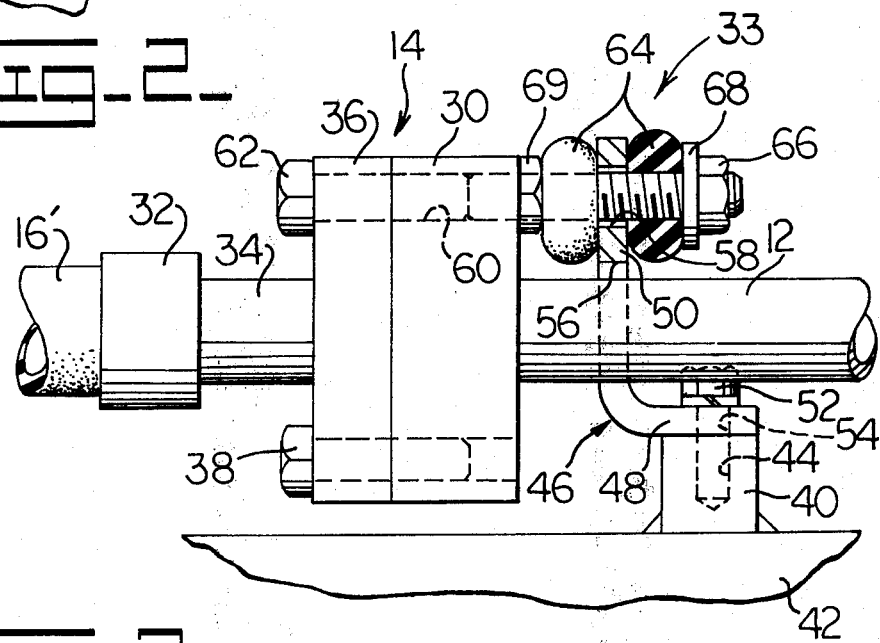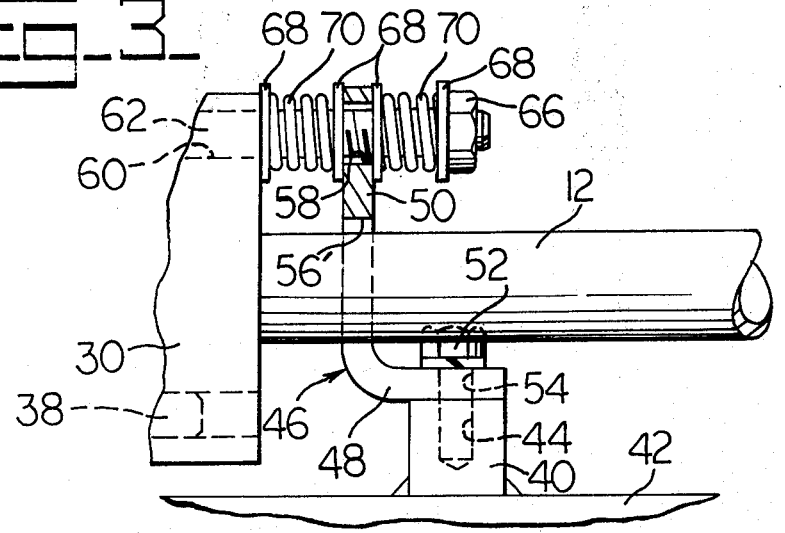

TUBE CLAMP MOUNTING

BACKGROUND OF THE INVENTION

1. Field of the Invention

This invention relates to mounting hydraulic lines on equipment and, more particularly, to a resilient mounting for a plurality of hydraulic lines to reduce detrimental abrasive wear to said lines.

2. Description of the Prior Art

In earthmoving equipment and similar equipment having two or more hydraulic lines for use in operating various parts of the equipment, it is a constant problem to retain the lines out of the way so as not to be pinched, torn loose or abraded against each other or against parts of the equipment. Different clamps or mountings have been designed which are secured on the frame of the equipment and are clamped to the lines to hold them in position relative to the frame and relative to each other. These clamps are attached rigid to the frame end, therefore, the constant vibration of the equipment loosens the clamps so that the lines become loose and unrestrained. In addition, since the lines are used to transmit hydraulic fluid, i.e. liquid, air or the like, from a pump to an actuator, surges of fluid pass through the lines causing pulsing, jumping, or lateral and radial expansion of the lines. The pulsing, jumping or expansion of the lines work the lines loose from the rigid clamps, once again, permitting the lines to shift and resulting in premature failure. An example of one prior art rigid clamp is shown in U.S. Pat. No. Re. 26,011 to D. A. Girard, issued May 3, 1966, wherein a plurality of tubes are rigidly clamped to a frame. Vibration of the frame will cause loosening of the bolts permitting the tubes to become loose and to abrade against the loose clamp or against each other.

U.S. Pat. No. 3,751,076 to Thais et al, issued Aug. 7, 1973 and assigned to the common assignee of the present application, overcame many of the problems of the prior art and provided a clamp or bracket that attached to a solid portion of a line so as to prevent constricting the opening in the line at the point where the clamp is attached to the line, thereby eliminating the added pulsing caused by the constriction and providing a solid support for the clamp on the line. Although the construction of U.S. Pat. No. 3,751,076 solved many of the prior problems and is used successfully in many areas, there are some applications where it suffers from being rigidly attached to the frame and to the lines making it possible for the clamp to work loose from the frame or from the connection to the line.

SUMMARY OF THE INVENTION

The problems of the prior art are overcome by my improved clamp or bracket which resiliently supports a plurality of lines relative to a frame. That is, a clamp or bracket is secured to a frame and has an upwardly disposed plate running transverse to the axis of the lines. The lines pass through openings in the plate. A bolt is passed through a fitting carried by the lines and through an opening in the plate with resilient means disposed between the fitting and the plate and between the plate and a nut on the bolt so that the lines are resiliently supported relative to the clamp or bracket and, therefore, relative to the frame. By resiliently supporting the lines, vibrations of the frame are not transmitted directly to the lines and surges or lateral and radial expansions of the lines are not transmitted directly to the bracket, therefore, the bracket is not likely to work loose from the frame or from the lines thereby permitting abrading the lines on each other and on the clamp.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a fragmentary isometric view showing an excavator boom upon which my resilient clamp mounting is attached;

FIG. 2 is an enlarged side view of one of the clamp mountings of FIG. 1; and

FIG. 3 is an enlarged side view illustrating a modified form of the clamp mounting of FIG. 1.

DESCRIPTION OF THE PREFERRED EMBODIMENT

As shown in FIG. 1, a piece of earthmoving equipment, in this case a boom 10 of an excavator, is shown with a plurality of flexible hydraulic lines or hoses 12 connecting a source of fluid (not shown) through a pair of connectors 14 and 15 to various lines 16 and 18 which, in the case of lines 16, direct the fluid to a stick cylinder 20 and a bucket cylinder (not shown). The stick cylinder 20 is pivotally mounted to the boom 10 by means of a pin 22 passing through trunnions 24 secured on the surface of the boom. During use of the excavator, the stick cylinder pivots about pin 22 thereby flexing the lines 16 relative to the boom. It is to be understood that the hydraulic lines or hoses 12, 16, 18 could be mounted on the frame of a hydraulically operated press, or any other hydraulically operated equipment, without departing from the spirit of my invention. That is, my invention is susceptible of use in any equipment where a plurality of hydraulic lines are used for conveying fluid, whether hydraulic fluid or air, from a source to a plurality of actuated parts through a connection therebetween.

The hydraulic lines 12 and 18 are steel tubes normally rigidly attached to each other by integral couplings 26 or fittings 30 and to boom 10 by fixed brackets 31. Some flexibility, such as afforded by coupling hoses 16 and 16', has been found desirable for the rigid lines to minimize detrimental affects of pressure surges and stresses acting within these members. A resilient mounting 33 located near the base of boom 10 will complement bracket 31 and serve to absorb all such line stress. Likewise, lines 16 and 16' are flexible hoses, or the like, and are connected through couplings 32 to complementing tube sections 34 which may be brazed or welded to a fitting 36. The fitting 36 mates with the corresponding fitting 30 to form connector 14 between lines 12 and 16' that is resiliently supported by mounting 33. The lower portions of the fittings 30, 36 are attached together by cap screws 38 which, when drawn up tight, will contribute toward effecting a seal between the fittings 30, 36 to prevent leakage of fluid from between the fittings.

A lug 40 is welded to the frame member 42 of the boom 10 and is drilled and tapped at one or more locations to form the tapped openings 44. An L-shaped bracket 46 has a mounting leg 48 and an upstanding plate 50 extending substantially at right angles to the leg 48. The bracket 46 is secured to the lug 40 and, therefore, to the frame 42 of the boom 10 by means of the cap screws 52 passing through openings 54 in the leg 48 of the bracket and being threaded into openings 44 in the lug 40. The plate 50 of the bracket 46 has two sets or rows of openings, one lower set being designated 56 and the upper or other set being designated 58. The lower openings 56 have a diameter somewhat larger than the diameter of the tube sections so that the tubes 12 may pass freely therethrough without the likelihood of abrading or brushing the walls of the openings 56 during use.

The upper set of openings 58 are aligned with appropriate openings 60 in the mating fittings 30,36 so that an elongate cap screw or bolt 62 may be passed through each opening 60 and is long enough to extend through one of the upper openings 58 in the plate 50 of the bracket 46 and extends beyond the plate 50 a predetermined amount. The openings 58 are of a diameter larger than the diameter of the bolt 62 so that the bolt 62 passes through opening 58 with clearance all around. Surrounding the bolt 62 and extending between the fitting 30 and the plate 50 of the bracket 46 is one or more coaxially disposed grommets 64 formed of rubber or rubber-like material. One or more grommets 64 are positioned around the threaded end of the bolt 62 beyond the plate 50 so that a nut 66, threaded on the end of the bolt 62, will compress the grommets 64 between the nut 66 and the plate 50 and between the plate 50 and the fitting 30. Spacer washers 68 or nuts 69 can be used between the grommets 64 and the fitting 30, both sides of plate 50 and the nut 66. The connector 14, which supports the hydraulic lines 12 and 16', is resiliently supported on the frame 42 of the boom 10 through the bracket 46, the bolt 62 and the grommets 64. That is, the connector 14 for the lines is not rigidly connected to and supported by the frame of the boom 10, but is resiliently supported by means of the bolts 62 and grommets 64 onto the bracket 46. In this way, the tubes or lines 12 and 16' may shift or vibrate or pulsate due to shocks, and the like, created in the hydraulic fluid in said lines without resisting a rigid connection to the boom. At the same time, vibrations of the boom 10 are not transmitted directly to the lines 12 and 16', but instead, are resiliently absorbed between the bracket 46 and the grommets 64 before the vibrations reach the connector 14 for the lines.

In FIG. 3, I have shown a modified form of my invention wherein the lines 12, 16 and 18 are connected through couplings 26, 32 to the tubes 34, respectively, into the mating portions or fittings 30, 36, the same as in the form of my invention shown in FIG. 2. The lug 40 welded to frame 42 supports the leg 48 of the bracket 46 with the plate 50 upstanding therefrom and having openings 58 therethrough. The leg 48 and the lower portion of the plate 50 is slotted as at 56' so that the bracket 46 may be assembled over the tube section 12 without removing the fitting 30 from the tube. The cap screws 52 pass through openings 54 in the leg 48 between the slots 56' and into openings 44 in the lug. The modification has to do with the provision of compression-type coil springs 70 concentrically around the bolts 62 between the plate 50 and the fitting 30 and between the plate 50 and the nut 66. Washers 68 are provided between the spring grommets 70 and the fitting 30, both sides of plate 50 and the nut 66. The nut 66 is drawn up tight enough to place the coil spring under compression so as to resiliently support the lines or hoses 12 and 16' through the connection 14, the bolt 62, springs 70 and bracket 46. The bracket 46 supports the springs 70 relative to the fitting 30 and connection 14. The mounting is such that vibrations from the frame of the boom will not be transmitted to the lines, and surges and vibrations in the lines will not be transmitted to the boom. In this way, the bracket is not likely to become loose and cause abrading of the hoses against each other or against the boom.

It is to be understood that where only one line 12 is being resiliently supported, only two bolts 62 and grommets 64 (or 70) will be required. However, when two or more lines 12 are resiliently supported, two or more bolts 62 and grommets 64 (or 70) will be required. The slots 56', described with respect to FIG. 3, could be used with the bracket of FIG. 2 in place of the openings 56, and the openings 56 of the FIG. 2 bracket could be used in place of the slots 56' of FIG. 3 without departing from the spirit of my invention.

It should also be noted that in some cases two bolts can be used more conveniently than long bolts 62 to secure the resilient mounting 33. In this event, a second bolt will engage grommets 64 and bracket and fitting openings 58 and 60. It is secured in the latter by lock nut 69.

I claim:

1. In a bracket for resiliently supporting a hydraulic line relative to a frame member, a fitting extending transverse to the axis of said line, said bracket having a leg secured to said frame member and having a vertically disposed plate upwardly projecting therefrom, said plate having an opening therethrough, fastening means passing through said fitting and through said opening in said plate, a retaining means secured to the outer end portion of said fastening means, resilient means positioned around said fastening means between said fitting and said plate, and further resilient means positioned around said fastening means and between said plate and said retaining means whereby said bracket supports said line through said resilient means and through said fastening means so that said line can shift and move relative to said frame member without loosening or abrading against said bracket.

2. In a bracket as claimed in claim 1 wherein said fitting supports plural lines in substantially parallel relationship, and said plate on said bracket has at least two openings, a fastening means for each of said openings in said plate, said fastening means extending from said fitting through said openings, and resilient means on each fastening means between said fitting and said plate and between said plate and the retaining means on each fastening means whereby the plural lines are resiliently supported against abrading each other.

3. In a bracket as claimed in claim 1 wherein said resilient means is a compressible grommet.

4. In a bracket as claimed in claim 1 wherein said resilient means is a compression spring.

5. In a bracket as claimed in claim 2 wherein said plate has another set of openings through which said lines freely pass.

6. In a mounting for a plurality of substantially parallel hydraulic lines, a fitting extending transverse to the axis of said lines and supporting said lines relative to each other, a bracket carried by a frame member and having a vertically disposed plate upwardly projecting therefrom, a first set of openings in said plate through which said lines freely pass, a second set of openings in said plate spaced from said first set of openings, fastening means passing through said fitting and through said second set of openings in said plate, resilient means positioned around said fastening means between said fitting and said plate, and further resilient means positioned around said fastening means between said plate and a retaining means fixed on the end of said fastening means whereby said bracket supports said lines through said resilient means and through said fastening means so that said lines can shift and move relative to said frame member without loosening or abrading against each other.

7. In a mounting as claimed in claim 6 wherein said resilient means is a compressible grommet.

8. In a mounting as claimed in claim 6 wherein said resilient means is a compression spring.

9. In a bracket for resiliently supporting at least two hydraulic lines relative to a frame member, a fitting secured to the lines and extending transverse to the axis of said lines, said fitting supporting said lines substantially parallel to each other, said bracket being carried by said frame member and having a plate extending vertically therefrom, a plurality of openings through said plate, fastening means passing through said fitting and through said openings in said plate, a retaining means secured to the outer end of said fastening means, and resilient means associated with said fastening means and being compressed between said fitting and said plate, and a second resilient means associated with said fastening means and being compressed between said plate and said retaining means whereby said lines are resiliently supported relative to the frame member.

10. In a bracket as claimed in claim 9 wherein said resilient means is a compressible grommet.

11. In a bracket as claimed in claim 9 wherein said resilient means is a compression spring.

12. In a bracket as claimed in claim 9 wherein said bracket is slotted so as to permit assembly of the bracket over the line without breaking the line.

* * * * *